United States Patent [19]

Reyen

[11] Patent Number: 4,756,115

[45] Date of Patent: Jul. 12, 1988

[54] FLEXIBLE SPREADER

[76] Inventor: Edward L. Reyen, 124 Hill St., Shelton, Conn. 06484

[21] Appl. No.: 62,668

[22] Filed: Jun. 16, 1987

[51] Int. Cl.⁴ ............................................ A01K 91/04
[52] U.S. Cl. .................................. 43/42.74; 43/44.84
[58] Field of Search .................. 43/42.72, 42.74, 43.1, 43/44.84, 27.4

[56] References Cited

U.S. PATENT DOCUMENTS

| | | | |
|---|---|---|---|
| 790,336 | 5/1905 | Yoerger | 43/42.74 |
| 2,170,788 | 8/1939 | Augenblick | 43/42.74 |
| 2,352,631 | 7/1944 | Guarnieri | 43/44.84 |
| 2,763,955 | 9/1956 | Mead | 43/42.74 |
| 3,217,443 | 11/1965 | Goodman | 43/42.72 |
| 3,714,730 | 2/1973 | Lloyd | 43/44.84 |

Primary Examiner—Kurt Rowan
Attorney, Agent, or Firm—S. Pal Asija

[57] ABSTRACT

A flexible spreader and double standoff for fishing is described. The device description includes method of making and using the same. The preferred embodiment comprises a spring, a monofilament nylon line fed and fixed through said spring. Also described are means for fixing relative positions of said spring and said monofilament nylon line. Also described is prior art use of a connecting link to hold the fishing hook on with a plastic tube over said prior art connecting link as an attractor. The art of using this invention with prior art fishing hooks, and sinkers to optimize catch of a variety of fish such as porgy, flats, black, sea bass, fluke, sea robins, sand flats, and cod is delineated.

11 Claims, 1 Drawing Sheet

FLEXIBLE SPREADER

SUMMARY

This invention relates to a new, useful, novel and improved spreader for fishing. A prior art search was conducted. The following 7 patents are typical of the prior art uncovered.

(A) Fishing Spreader Assembly U.S. Pat. No. 3,744,178 issued to Thomas A. Denny on July 10, 1973.
(B) Fish Hook Spreader U.S. Pat. No. 1,123,636 granted to S. Wiesenfield on Jan. 5, 1915.
(C) Fish Hook Spreader & Suspender U.S. Pat. No. 872,934 awarded to J. B. Harig on Dec. 3, 1907.
(D) Snell Attachment for Fish Lines U.S. Pat. No. 790,336 issued to G. Yoerger on May 23, 1905
(E) Fishing Line Spreader U.S. Pat. No. 353,412 awaraded to H. C. Behrens on Nov. 30, 1886.
(F) Fishing Line Leader U.S. Pat. No. 186,134 jointly issued to W. T. Jahne and A. Moors on Jan. 9, 1877.
(G) Fishing Line Sinker U.S. Pat. No. 14,587 granted to inventor Smith on Apr. 1, 1856.

Unfortunately none of the prior art patents disclose the concept of a flexible spreader, which is critical in this invention. Flexibility in prior art devices has been interrupted by incorporation of rigid member in the spreader, or by connection of the sinker directly to the spreader. Inventor on the other hand alone uses the completely flexible spreader without any rigid member. Inventor does not connect the sinker to the spreader. There is no rigid member between the angler's hand and the fish hook except the conventional semirigid rod itself. Without such a flexible spreader the feel on the hand of the Angler of fish tugging on the line is greatly reduced.

Accordingly the following are some of the objectives of this invention.
(a) To provide high feel sensitivity to the angler irrespective of which side the fish bites the bait first, comparable to the feel experienced in fishing without a spreader.
(b) To provide low resitance to water currents
(c) To design the flexible spreader and double standoff as durable light weight, modular, multipurpose and reuseable
(d) To facilitate catching heavy fish two at a time.
(e) To be useable as a kit Other objectives of this invention reside in its simplicity and non-obvious creativity which will become apparent from the following detailed desription of the preferred embodiment and accompanying drawing.

DETAILED DESCRIPTION OF THE PREFERRED EMBODIMENT

Figure 1:
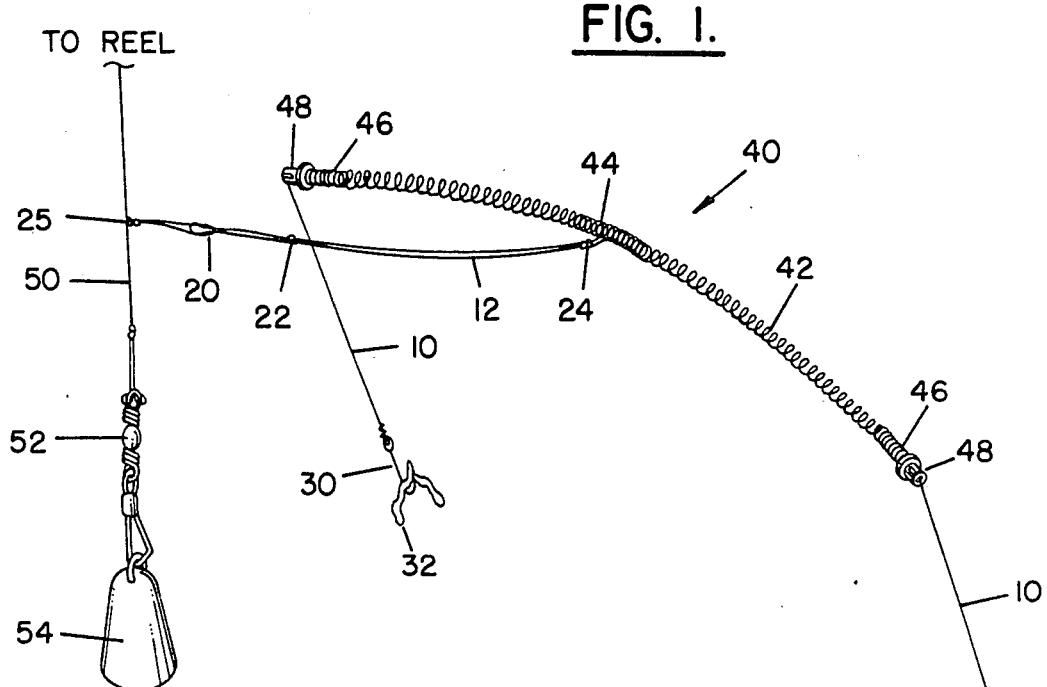
FIG. 1 shows a plan view of the improved fishing spreader and double standoff of this invention.
Figure 3:
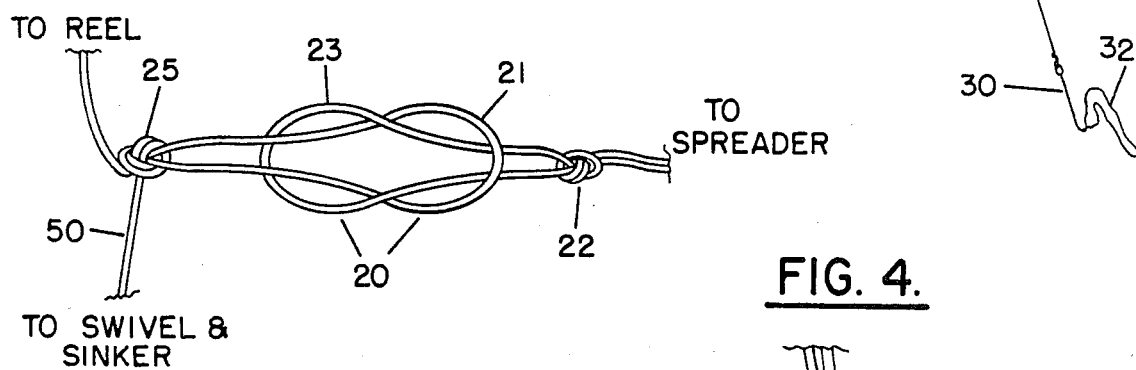
FIG. 3 shows the lower knot which is the link between the spreader on the one end and the line and the sinker combination on the other end.

The preferred embodiment comprises a flexible spring 40 having a few fine narrow turns at each end 46 as well as at the center 44 and a monofilament nylon line 10 which is folded in half to make dual filament line 12 and an overhand loop 20. Each end of this line is passed through the center by starting at the nearest coarse turn 42 and weaved through said spring 40 one to each end of the spring where it is clamped with a crimp 48 with several inches hanging beyond the spring. A fish hook 30 is attached to each end of this monofilament line. A sinker 54 is attached to the line 50 via swivel hook 52. Thus the sinker is connected to the line and not to the spreader. Knots 22 and 24 are made on the dual filament line 12 which in concert with crimps 48 ensure that relative positions of spring and the line do not change. Thus knots 22, 24, and 25 separate the spreader from the sinker.

The following detailed instructions will facilitate practice of this invention by a person of average skill in the art. Typical materials and value ranges are suggested where appropriate. Since the inventor is an avid fisherman with over 40 years of experience, the values used by him in the test embodiment are also given for general guidance.

(1) To make the flexible spring, use stainless steel tempered wire of approximately 0.020 inches diameter. Wind a few close turns at one end (the inventor used 4 in the test embodiment) then many coarse turns to near center. Then wind approximately twice as many close turns at the center as were used at the end (the inventor used 8 in the test embodiment) Then once again plurality of coarse turns to near end. Then finish the spring with a few (same number as at the other end is recommended) more close turns at the end. Length of the spring can vary according to the angler's need. 8 to 12 inches is optimum range. The test embodiment spring was 8 inches overall.

The purpose of the narrow or fine turns or windings at each end is to prevent the line from sliding into it and then following back up the coarse windings. In other words in combination with the crimps narrow windings ensure relative fixed position between the monofilament line and the spreader spring.

Figure 4:
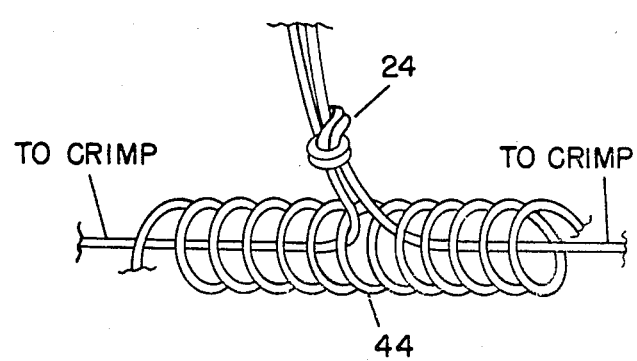
FIG. 4 shows a closeup view of the interface between the monofilament nylon line and the spreader spring, more particularly one turn separation between the left and right prongs.
Figure 2:
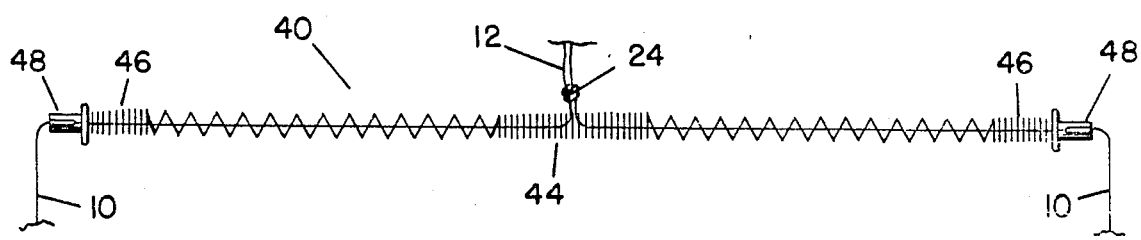
FIG. 2 is a side view of the improved fishing spreader and double standoff of this invention.

(2) Cut 3 to 4 feet of monofilament line. (The inventor in the test embodiment used 45 inches of 30 pound test line) For ease of threading a diagonal cut is recommended. Fold the monofilament line 10 in half to make dual filament line 12. Make one inch overhand loop 20 with an upper knot 22 at folded half (The loop diameter in the test embodiment was 3 inches) Make another knot known as lower knot 24 approximately 3 inches from the loop. This dimension is not critical. Feed monofilament line through the spring. Start with one end of monofilament line at first coarse turn beyond center. Guide it through the spring to one end of the spring. Do the same with the other end starting at the adjacent coarse turn guiding it through the spring to the other end. This ensures one turn separation between the left and the right prong as shown in FIG. 4. This in turn avoids accidental slipping of the monofilament fishing line with respect to spring 44.

(3) By holding the monofilament nylon line at the overhand lower knot 24 rotate or spin wire so that the filament line is centered in the middle of the close center wire widing 44. (The number of rotations of the entire spring along the longitudenal axis approximates half the number of fine or narrow turns in the center of the spring for example in the test embodiment half of 8 is 4).

The objective of this procedure is to bring the filament line in the center rather than the starting point which was the nearest coarse turn. This procedure leaves a few inches of monofilament line at each end. The ends may be cut equal or left unequal according to the personal preferences of the angler. This extension may vary from a few inches to a foot.

(4) Use a small crimp at each end of spring on the monofilament line. Leave a small gap (approximately one sixteenth of an inch) between the spring and the crimp and then crimp it to the monofilamnet nylon line. Then hang a fish hook at each end. Use a connecting link to hold the hook on with a plastic tube over the link as an attractor. The connecting link facilitates change of hooks.

(5) To attach to line put a swivel clip at end of line to receive a sinker. Then make a loop in the line at desired height from the bottom. (the inventor in the test embodiment had two inches from the bottom) Then insert loop of spreader into the loop of fishing line and thread spreader through spreader loop. Hang sinker (one to 4 oz in weight) into the swivel clip. This weight may be varied according to the current and depth of water.

(6) Use clams, sandworms, bloodworms, tape worms and the like as live bait and lure. Then enjoy catching porgy, flats, blacks, sea bass, flukes, sea robins, sand flats, cods and plaice etc etc.

As the first fish bites on bait even a gentle tug is felt by the angler. For all practical purposes the entire assembly acts as a single line. The weight of the flexible spring is neglegible and offers neglegible resitance to currents. Because of the flexible nature of the spring the side which is bit first by the fish becomes approximately vertical and in line with the main line and the other side springs out of the way. This is true because the weight of the half of the spring with no fish is neglegible compared to the weight of the other half of the flexible spring with fish on hook. If two fish bite simultaneously which the inventor experienced frequently, it simply doubles the angler's excitment.

This has been a description of the preferred and test embodiment of the inventors creation. Many changes may be made to this configuration according to an angler's personal preferences style and taste needs as well as developing state of the art without deviating from the spirit of the invention. Some examples of such changes are as follows:

(a) Different materials and dimensions may be used than those described or recommended here.
(b) Assembly may be made in a different order than that used by the inventor in the text embodiment.
(c) The invention may be incorporated into new fishing gear or sold as a kit.
(d) Aesthetic packaging and designs may be incorporated to add market appeal for different market niches.
(e) A second spreader may be added to the same line a few inches from the first one.
(f) Multiple spreaders may be 10 to 20 inches apart.

Following is a listing of the components used in the preferred embodiment arranged according to the ascending order of the reference numerals.

10=Monofilament nylon line
12=Folded monofilament line
20=Overhand Loop
21=Reel Sinker Combination Filament Line
22=Upper overhand knot
23=Folded Mono Filament Line to Spreader
24=Lower Overhand Knot
25=Reel Sinker Interface Knot
30=Fish Hook
32=Live bait or lure
40=Spring
42=Coarse turns in spring
44=Narrow or fine turns in the center of spring 40
46=Narrow or fine turns at end of spring 40
48=Crimp at end of spring 40
50=Sinker line or chord
52=Swivel clip
54=Sinker The inventor claims:

1. A flexible spreader and double stand off for fishing comprising:
   (a) a longitudinal flexible spring of coarse turns having a few narrow turns in its center and at each end of said longitudinal flexible spring;
   (b) a folded monofilament line weaved through said flexible spring starting through the center and extending beyond each end of said spring;
   (c) a pair of fasteners, one on each end of said spring to crimp said monofilament line in place;
   (d) a pair of fish hooks fastened one on each end of said monofilament line;
   (e) a fishing line connected to an end of said folded monofilament line; and
   (f) a sinker connected to said fishing line via a swivel clip.

2. A flexible spring spreader and double stand off for fishing of claim 1 where in two prongs of said folded monofilament line at the center of the spring are separated by one turn of the spring.

3. A flexible spring spreader and double stand off for fishing of claim 1 where in two prongs of said folded monofilament line at the center of said spring are separated by plurality of fine narrow turns in the spring.

4. A flexible spring spreader and double stand off for fishing of claim 1 where in said pair of fasteners are fastened after leaving a small gap between the spring and the fastener.

5. A flexible spring spreader and double stand off of claim 1 where in said spring spreader and said sinker are separated by a segment of said folded monofilament line.

6. A process for making a flexible spring spreader assembly and double stand off for catching fish comprising the steps of:
   (a) making a longitudinal flexible spring of coarse turns having a few fine narrow turns at each end and at the center of said longitudinal flexible spring;
   (b) folding a monofilament line into two and weaving each end through half of said spring starting each end at the center and extending beyond one of the edges of said spring;
   (c) crimping said fishing line adjacent to the spring at each end over the filament line which extends a few inches beyond said spring so as to fix the relative position between the spring and the monofilament line;
   (d) hanging a fish hook at each hanging end of said monofilament line; and (e) connecting a line and a sinker via a swivel clip to an end of said folded monofilament line of the spring spreader assembly.

7. A process for making flexible spring spreader and double stand off of claim 6 wherein flexible spring is made from stainless steel tempered wire of approximately 0.020 inches diameter and where in twice as many fine turns are employed in the center as at each end separated by coarse turns in between.

8. A process for making flexible spring spreader and double stand off of claim 7 wherein weaving folded monofilament line through said spring comprises the following steps:
 (a) diagonally cutting 3 to 4 feet of monofilament 30 pound weight test line;
 (b) folding said diagonally cut monofilament line in half;
 (c) making an approximately one inch wide overhand loop by a knot on said folded monofilament line;
 (d) feeding one end of said diagonally cut monofilament line at a first coarse turn beyond center and guiding it through the spring to one end of the spring;
 (e) feeding the other end of said diagonally cut monofilament line starting at the adjacent coarse turn, to said first coarse turn beyond center, and then guiding it through the spring to the other end; and
 (f) rotating or spinning said spring with respect to said folded monofilament line overhand loop till the filament line is approximately centered in the middle of the fine turns at the center.

9. A process for making flexible spring spreader and double stand off of claim 6 wherein a small gap of approximately one sixteenth of an inch is left between the spring and the crimp in executing said crimping step 6 (c) supra.

10. A process for making flexible spring spreader and double stand off of claim 9 wherein the spring spreader assembly so made is attached to the line and the sinker comprising the following steps:
 (a) attaching a swivel clip at the end of a line to receive a sinker;
 (b) making a loop in the fishing line at the desired height from the bottom;
 (c) inserting the loop of the spreader onto the loop of the fishing line;
 (d) threading fishing line through fishing line loop; and
 (e) hanging a sinker of suitable weight on the swivel clip.

11. A process for making flexible spring spreader and double stand off for fish comprising the steps of:

(a) making a flexible spring of coarse turns having a few fine narrow turns at each end and at the center; and where in further said flexible spring is made from stainless steel tempered wire of approximately 0.020 inches diameter and where in twice as many fine turns are employed in the center than at each end separated by coarse turns in between;
 (b) folding a mono filament line into two and weaving each end through half of said spring starting each end at the center and extending beyond one of the ends of said spring, which in turn comprises the following detailed steps;
  (i) diagonally cutting 3 to 4 feet of monofilament 30 pound weight test line;
  (ii) folding said diagonally cut monofilament line in half;
  (iii) making approximately one inch wide overhand loop by a knot in said folded mono filament line;
  (iv) feeding one end of said diagonally cut monofilament line at first coarse turn beyond center and guiding it through the spring to one end of the spring;
  (v) feeding the other end of said diagonally cut monofilament line starting at the adjacent coarse turn, to said first coarse turn beyond center, and then guiding it through the spring to the other end; and
  (vi) rotating or spinning said spring with respect to said folded monofilament line overhand loop till the filament line is approximately centered in the middle of the fine turns at the center;
 (c) crimping said fishing line adjacent to the spring at each end over the filament line which extends a few inches beyond said spring so as to fix the relative position between the spring and the monofilament line and wherein a small gap of approximately one sixteenth of an inch is left between the spring and the crimp;
 (d) hanging a fish hook at each hanging end of said monofilament line; and
 (e) connecting a line and a sinker via a swivel clip, to an end of said folded mono filament line of the spring spreader comprising the following detailed steps;
  (i) attaching a swivel clip at the end of a line to receive a sinker;
  (ii) making a loop in the fishing line at the desired height from the bottom;
  (iii) inserting the loop of the spreader into the loop of the fishing line;
  (iv) threading spreader through fishing line loop; and
  (v) hanging a sinker of suitable weight on the swivel clip.

* * * * *